F. W. GURNEY.
EQUALIZING DEVICE FOR BALL BEARINGS.
APPLICATION FILED AUG. 2, 1909.
993,594.
Patented May 30, 1911.
2 SHEETS—SHEET 1.
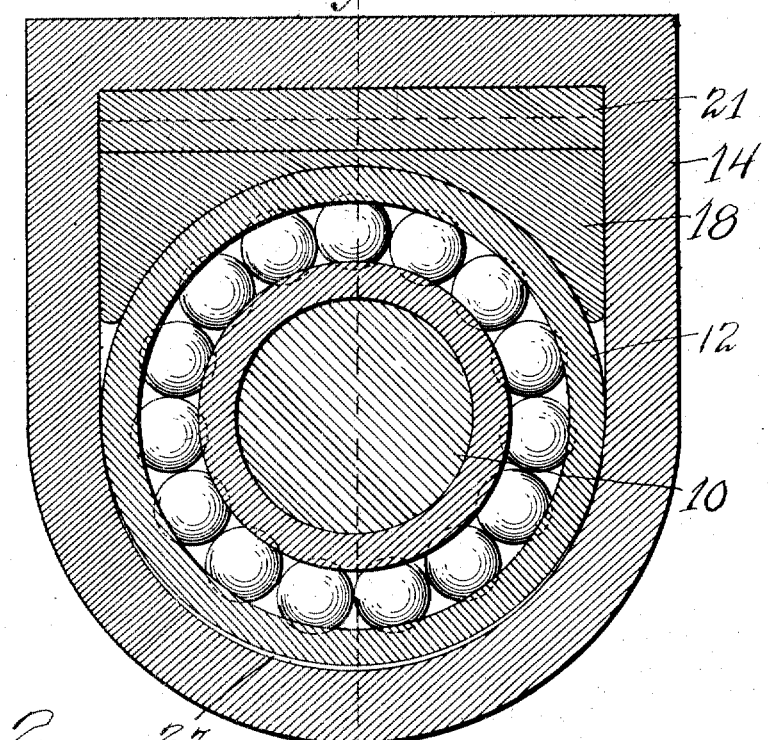
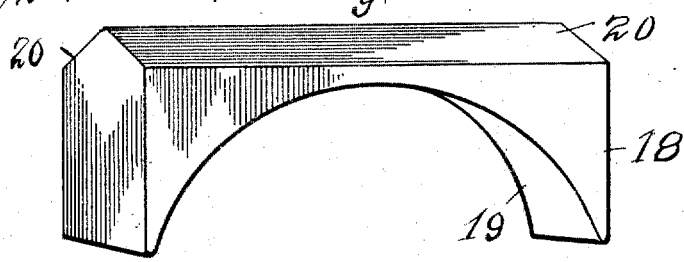
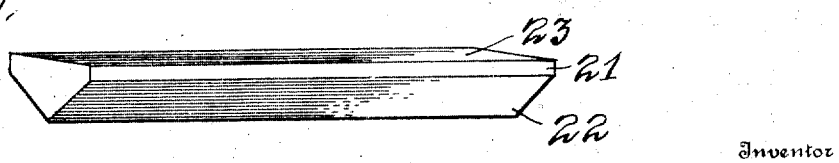

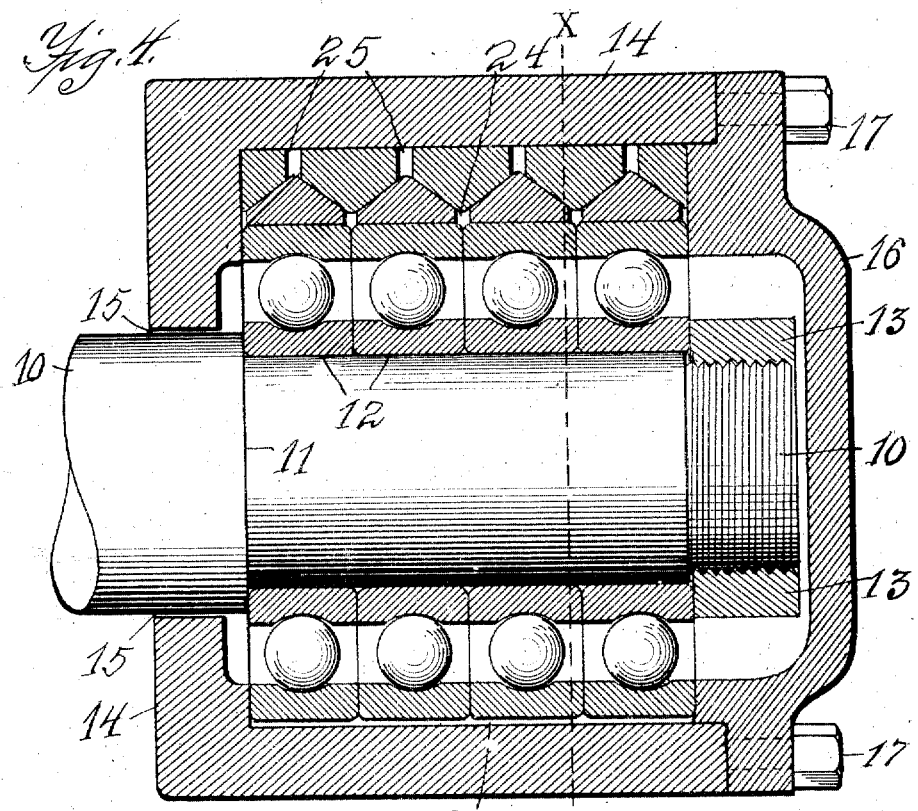
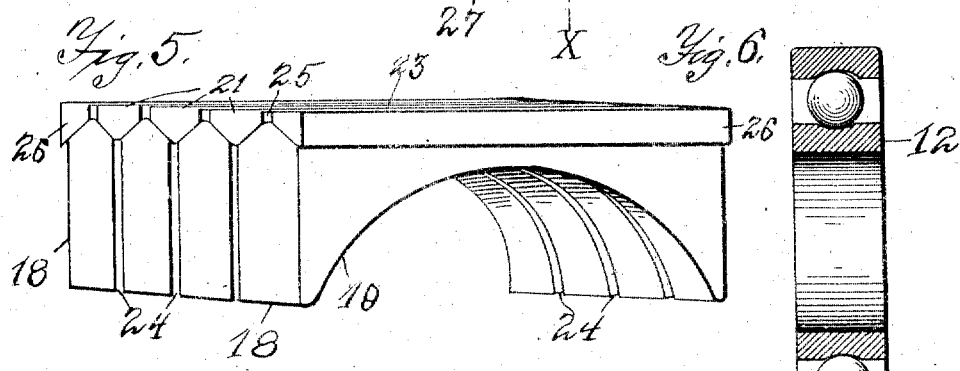

UNITED STATES PATENT OFFICE.

FREDERICK W. GURNEY, OF JAMESTOWN, NEW YORK.

EQUALIZING DEVICE FOR BALL-BEARINGS.

993,594.  Specification of Letters Patent.  Patented May 30, 1911.

Application filed August 2, 1909. Serial No. 510,722.

*To all whom it may concern:*

Be it known that I, FREDERICK W. GURNEY, a citizen of the United States, residing at Jamestown, in the county of Chautauqua and State of New York, have invented new and useful Improvements in Equalizing Devices for Ball-Bearings, of which the following, taken in connection with the accompanying drawings, is a complete, clear, and exact description.

The object of the invention is to secure a simple and effective means for distributing or equalizing the load over a series of unit ball bearings. Such a series of annular ball bearings has not hitherto been successfully mounted on a shaft or journal within a housing for sustaining great loads for two reasons; first, the bearings may not be readily made with such accuracy of size and fit that each bearing of the series will receive an equal load, for the bearing that is slightly the largest or has the snuggest fit will carry the most of the load; second, under very heavy loads the shaft will spring so that even perfect bearings will bear unequal portions of the total load. The present invention equalizes the load in either of these cases. The individual bearings of the series may vary in size or in fit, or the shaft may be deflected by excessive load and the load will still be equal upon the several units.

The improvements consist in providing a series of saddle pieces, one to each unit, and a corresponding series of wedge pieces, which fit between the saddle pieces, within the housing or casing. These saddle pieces and wedge pieces are free to slide on each other and must so move under any inequality of pressure thereby overcoming that inequality, which is the end desired. This action is the same in effect as that of a fluid cushion.

In the drawing, Figure 1 is a sectional view at line X X in Fig. 4, showing the equalizer in position within the casing. Fig. 2 is a perspective view of a single saddle piece, as provided for each unit bearing. Fig. 3 is a perspective view of one of the wedge pieces which bears between the saddle pieces. Fig. 4 is a sectional view of a series of unit bearings at line Y Y in Fig. 1. Fig. 5 is a perspective view of a series of saddle pieces and wedge pieces assembled. Fig. 6 is a sectional view of a unit ball bearing.

Similar numerals refer to corresponding parts in the several views.

The numeral 10 indicates the shaft or journal which is here shown with a shoulder 11, which serves to hold one end of the series of unit bearings 12, and a nut 13 holds the other end of the series. A casing or box 14 is provided having an opening 15 in the rear side for the shaft 10, and a cap 16 which is attached by means of suitable screw bolts 17. The lower portion of the casing 16 is made round to receive therein the unit ball bearings 12, as shown in Fig. 1, and the upper portion is made square to receive the equalizing device.

The equalizing device consists of the saddle pieces 18, which are formed with a curve 19 on their under side to fit the ball bearing, and a wedge shaped upper side 20 beveled sidewise in both directions from about the middle of the saddle piece. The wedge pieces 21 have an inversely V-shape beveled under side 22, and a flat upper side 23 which fits within the flat inner side of the casing 14. The under side 22 is beveled to correspond to the bevel 20 of the upper side of the saddle pieces, so that the wedge piece 21 fits between two of the saddle pieces. The saddle pieces 18 are narrower in width than the ball bearings, so as to allow a certain amount of play between the saddle pieces, as shown at 24 in Figs. 4 and 5, and a corresponding space 25 is provided between the wedge pieces 21, which clearance permits of a sidewise movement of the saddle and wedge pieces when assembled. These several pieces thus produce interwedging series.

When a multiple ball bearing, made up of a series of unit ball bearings, is assembled on a journal, the equalizer is assembled by placing the saddle pieces 18, one upon each of the unit bearings, and a wedge piece 21 is provided between each of the saddle pieces. In order to hold the outer saddle pieces 18, an idle half wedge piece 26 is provided at each side of the bearing, as shown in Figs. 4 and 5, each of which idle pieces may be a separate piece or may be made integral upon the cap 16 and housing 14, it only being necessary that the beveled lower side shall correspond to the bevels of the wedge pieces 21, and when made as a separate piece, as it is preferably, it is apparent that its office is only an idle block or wedge to hold the parts in place and fit squarely into the corner of the casing. After the equalizer is in place, the casing 14 may be slipped over the same and the cap 15 attached thus assembling the entire multiple bearing with its equalizer on the journal.

The action of the device is as follows: If one of the bearings is a little large, the outside is higher than the other bearings. Its saddle piece 18, with its beveled faces accordingly projects correspondingly higher between the wedge pieces 21, and thereby forces the wedge pieces a little farther apart. In forcing these wedge pieces apart, they crowd onto the beveled faces of the saddle pieces 18 on the bearings on either side, and by their wedging action force them down onto their respective bearings, thus transmitting to the smaller bearings the load that would otherwise come in excess upon the larger bearing. It is obvious that by this interwedging action, the load is equalized or distributed over all the units of the series of bearings regardless of the variations there may be in the size and fit of the several units. This same adaptation, or interwedging action, will also result from the springing or deflecting of the journal. There is no bearing except on the sliding faces, and the beveled and rectilinear faces of these interacting parts will not remain in a state of unequal pressure but will slide on each other until an equilibrium of pressure is realized, at which point an exact equalization of the load upon the several units will be effected.

I claim as new:

1. A load distributing device for a series of annular or unit ball bearings consisting of two series of interacting, interwedging members, a box or casing for said members, one of said series of interwedging members in contact with the bearings and the other series of interwedging members in contact against the box or casing.

2. A load distributing device for a series of unit ball bearings consisting of two series of intersliding wedge shaped members, a confining means for one of said series, one of said series formed to fit said units one to each unit, and the other series of wedge shaped members in contact with said confining means.

3. A load distributing device for a series of unit ball bearings consisting of two series of intersliding wedge shaped members, a confining means for said series. one of said series formed as saddle pieces for said unit bearings one to each unit, and the other series of members in contact with said confining means, said wedge-shaped members assembled with a suitable clearance therebetween to allow a sidewise movement for each member.

4. A load distributing device for a series of unit ball bearings consisting of a series of saddle pieces one to each unit, said saddle pieces wedge shaped on their outer edges, and a second series of wedge pieces operatively placed between said saddle pieces to receive the load.

In testimony whereof I have signed my name to this specification in the presence of two subscribing witnesses.

FREDERICK W. GURNEY.

Witnesses:
N. PETERSON,
A. L. FURLOW.